UNITED STATES PATENT OFFICE.

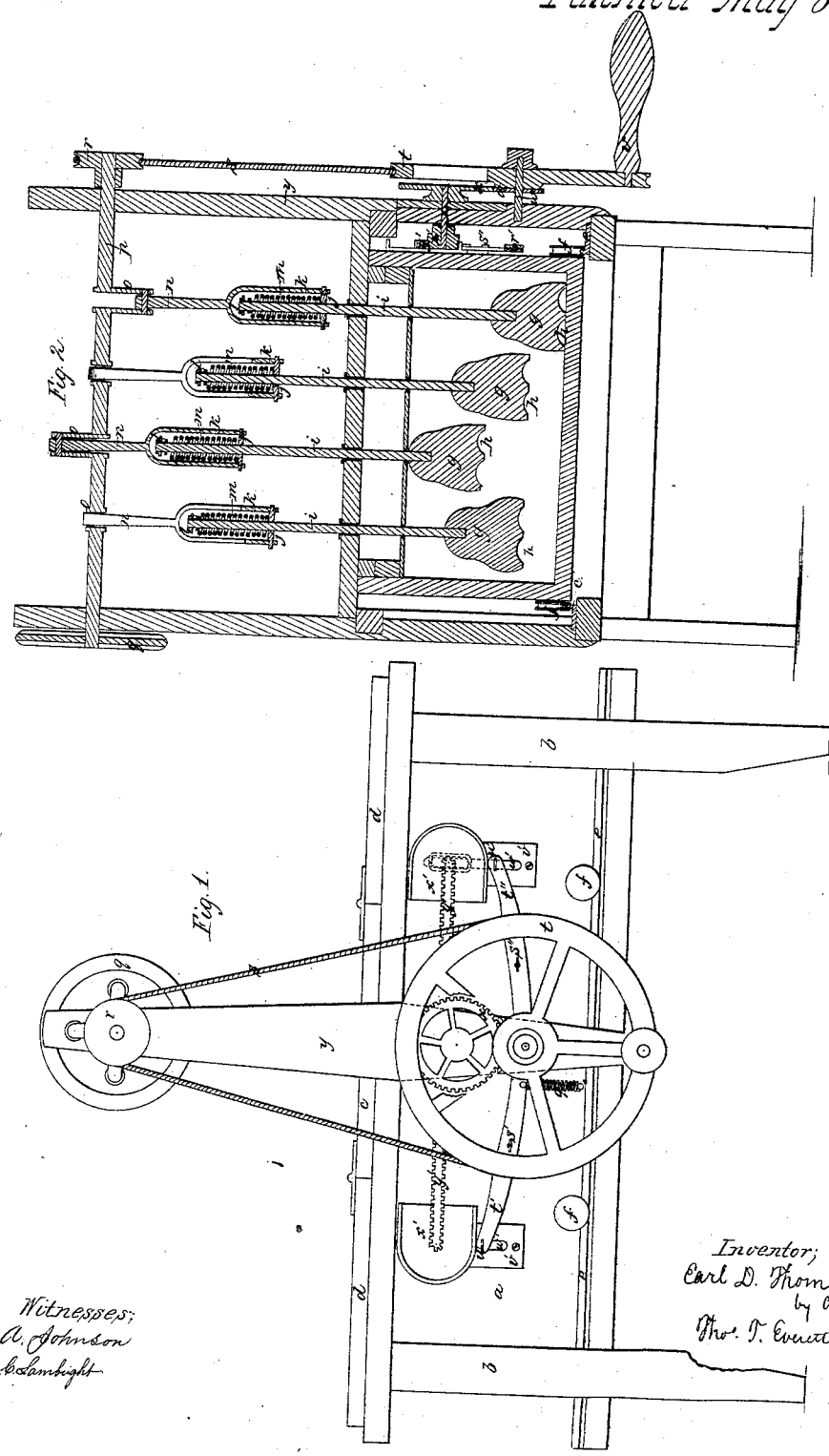

EARL D. THOMAS, OF ROCHESTER, NEW YORK.

WASHING-MACHINE.

Specification of Letters Patent No. 28,215, dated May 8, 1860.

*To all whom it may concern:*

Be it known that I, EARL D. THOMAS, of the city of Rochester, in the State of New York, have invented certain new and useful Improvements in Washing-Machines; and I do hereby declare that the following is a full, clear, and exact description thereof, reference being had to the accompanying drawings and to the marks and letters thereon.

This washing machine is more specially designed for large pieces or the more bulky and heavier articles, though with my improvements a machine of any size may be constructed, either for very light or small articles or very heavy, and the machine may be worked by hand or by any motive power.

Of the drawings forming part of this specification Figure 1 is a side view of a machine with my improvements, and Fig. 2 a transverse vertical section of the same taken in a line drawn through the center of the main shaft and the shaft of the power wheel.

As is shown by the drawings, the box or tub of this machine marked ($a$) is supported by frame bars ($b$), has a top ($c$) with two covers ($d, d$), and has traverse upon a rail-bar ($e$) upon which run the rollers ($f$) attached to the bottom of the tub or box. Within this box are several pounders ($g$), the number and size of which will be due to the size of the machine and the character of the articles designed to be operated upon. The drawings show four pounders each having in their bottoms annular recesses ($h$) and the stem or rod ($i$) of each passing through a pivoted base piece ($j$) of a yoke or fork ($k$). Between a cap ($l$) on the upper end of these rods and the base piece and surrounding the rods are helical or coiled springs ($m$), so that the stroke of the pounder upon the article being washed is made yielding as the rod and spring play within the yoke.

From the top of each yoke passes a rod ($n$), each rod being connected to a crank ($o$) upon the main shaft ($p$), and, as is shown by the drawing, each crank is at right angles to the others next to it. This arrangement of the cranks gives the pounders alternating action and as the box is moved backward and forward subjects every portion of the articles being washed to the action of the pounders. At one end of the main shaft is a fly wheel ($q$), and at the other end a pulley ($r$) around which passes a band or cord ($s$), subjecting the pulley to the rotation of the power wheel ($t$) upon its shaft ($u$) and which is actuated by a crank ($v$) by hand or by being put in connection with any motive power.

The recesses in the bottom of the pounders are regarded as preferable to the flat, smooth surface, as such recesses allow of a little play of the fabric being washed and also to some extent cushion the pounder by the air within the recesses.

The same power which actuates the pounders also gives motion to the box or tub. This motion is communicated from the shafts ($u$) by a pinion ($w$) upon it which gears into a toothed wheel ($x$) upon the vertical bar ($y$) of the machine. A small shaft ($z$), to which wheel ($x$) is attached, passes through bar ($y$) and has upon its inner end a pinion ($z'$). The teeth of pinion ($z'$) fit into the spaces between the teeth of the double toothed or ratchet-bar ($y'$) and as the pinion is rotated the bar being attached to the box and having reciprocating motion gives the like motion to the box or tub. This toothed bar is attached to the side of the box thus:—Each end of it is secured or affixed to a plate ($x'$) upon the inner side of which is a flanged extension piece, and which is indicated in Fig. 1, by blue dots. The flange of this piece extends on both sides of the slot ($w'$) of a plate ($v'$) affixed to the side of the box. The flanges of these extension pieces, therefore, hold the plates ($x'$) against the plates ($v'$) while the toothed bar and its end plates have the upward and downward motion given to them by the traversing of the pinion ($z'$). At the lower side of the plates ($x'$) is an extension or projection ($u'$) to which is pinned the outer ends of the levers ($t', t''$). Lever ($t'$) has its fulcrum at ($s'$) and lever ($t''$) at ($s''$), the inner ends of the levers being connected by a pin ($r'$) in the one fitting into a slot in the other. Near the inner end of ($t'$) is a coiled spring ($g'$) the tendency of which is to draw down the inner ends of both levers and consequently to elevate the plates ($x'$) and the toothed bar, and thus to keep the pinion in contact with the upper surface of the bar while the pinion is traversing that surface, and to aid the pinion in action upon the ends of the bar. The holes in the levers at the points where they are attached to the sides of the box and connected to the plates are elongated, or are slots, the whole or a part of them, so as to allow more freedom of motion or play than mere holes would.

It is evident that instead of having the levers and spring below the toothed bar and so arranged as to keep the upper toothed surface and the pinion in contact by their power, they may be arranged above the bar so that the tendency of the spring will be the reverse as shown and named.

What I claim as my invention and desire to secure by Letters Patent is—

1. The arrangement of the pinion upon the power shaft, the double toothed or ratchet bar, the levers, and the spring for giving the traverse to the box as described, and in connection therewith I claim—

2. The arrangement of the pounders having the spring yoke connection herein set forth and attached to the main shaft by the cranks placed at right angles to each other as described.

This specification signed this 16th day of April 1860.

EARL D. THOMAS.

Witnesses:
T. T. EVERETT,
G. C. LAMBRIGHT.